US009729355B2

(12) United States Patent
Yang (10) Patent No.: US 9,729,355 B2
(45) Date of Patent: Aug. 8, 2017

(54) METHOD, DEVICE AND SYSTEM FOR REMOTE MANAGEMENT OF TERMINAL PERIPHERAL

(71) Applicant: ZTE Corporation, Shenzhen, Guangdong (CN)

(72) Inventor: Kun Yang, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 167 days.

(21) Appl. No.: 14/438,065

(22) PCT Filed: Jul. 30, 2013

(86) PCT No.: PCT/CN2013/080435
§ 371 (c)(1),
(2) Date: Apr. 23, 2015

(87) PCT Pub. No.: WO2013/167092
PCT Pub. Date: Nov. 14, 2013

(65) Prior Publication Data
US 2015/0304129 A1  Oct. 22, 2015

(30) Foreign Application Priority Data

Oct. 26, 2012  (CN) .......................... 2012 1 0417329

(51) Int. Cl.
H04L 12/66  (2006.01)
H04L 29/08  (2006.01)
H04W 4/00  (2009.01)

(52) U.S. Cl.
CPC ............ *H04L 12/66* (2013.01); *H04L 67/125* (2013.01); *H04L 67/34* (2013.01); *H04W 4/001* (2013.01); *H04W 4/005* (2013.01)

(58) Field of Classification Search
CPC .... H04L 29/08099; H04L 41/08–41/12; H04L 67/025; H04L 67/12; H04L 67/125; H04W 4/001; H04W 4/005; H04W 4/006
See application file for complete search history.

(56) References Cited

U.S. PATENT DOCUMENTS

2011/0213871 A1  9/2011  Digirolamo
2012/0311142 A1*  12/2012  Stargardt ............. H04W 4/005
709/224

(Continued)

FOREIGN PATENT DOCUMENTS

CN  101895900 A  11/2010
CN  102142980 A  8/2011

(Continued)

OTHER PUBLICATIONS

International Search Report in international application No. PCT/CN2013/080435, mailed on Oct. 31, 2013.

(Continued)

*Primary Examiner* — Pao Sinkantarakorn
(74) *Attorney, Agent, or Firm* — Oppedahl Patent Law Firm LLC (57) ABSTRACT

A method, a device and a system for remote management of a terminal peripheral are described. The method includes that: a Machine-to-Machine/Man (M2M) gateway forwards data sent from a terminal peripheral to an M2M application or an M2M service platform; the M2M application or the M2M service platform sends a remote management operation to the terminal peripheral through the M2M gateway according to the data forwarded by the M2M gateway; and the M2M gateway processes the remote management operation according to remote management operation execution information fed back by the terminal peripheral and reports a remote management result.

13 Claims, 3 Drawing Sheets

(56) References Cited

U.S. PATENT DOCUMENTS

2013/0024556 A1* 1/2013 Zhu ...................... H04L 41/042
                                                        709/223
2013/0041997 A1   2/2013 Li et al.
2013/0294285 A1* 11/2013 Zhang .................. H04W 24/02
                                                        370/254

FOREIGN PATENT DOCUMENTS

| CN | 102238573 A | 11/2011 | | |
|----|-------------|---------|---|---|
| CN | PCT/CN2011/074608 | * 12/2011 | ............ | H04L 41/08 |
| CN | 102378162 A | 3/2012 | | |
| EP | 2466791 A1 | 6/2012 | | |
| EP | 2605610 A1 | 6/2013 | | |
| WO | 2012109531 A2 | 8/2012 | | |

OTHER PUBLICATIONS

English Translation of the Written Opinion of the International Search Authority in international application No. PCT/CN2013/080435, mailed on Oct. 31, 2013.

Supplementary European Search Report in European application No. 13788275.9, mailed on Oct. 6, 2015.

Bluetooth technology strategic analysis of its role in global 3G wireless communication era, mailed on Jul. 2002.

\* cited by examiner

METHOD, DEVICE AND SYSTEM FOR REMOTE MANAGEMENT OF TERMINAL PERIPHERAL

TECHNICAL FIELD

The disclosure relates to a Machine-to-Machine/Man (M2M) communication technology, in particular to a method and a system for remote management of a terminal peripheral.

BACKGROUND

At present, an M2M application or an M2M service platform directly sends remote management operation to a terminal peripheral through an M2M gateway to implement remote management of the terminal peripheral instead of sending it by parsing data information of the terminal peripheral. Thus, the remote management is not targeted and cannot be processed subsequently, accordingly, the terminal peripheral cannot be remotely managed effectively. Here, the terminal peripheral refers to single equipment having an environment perception function such as a sensor.

SUMMARY

In view of this, a main objective of embodiments of the disclosure is to provide a method, a device and a system for remote management of a terminal peripheral, in order to remotely manage the terminal peripheral effectively.

To this end, the technical solution of the embodiment of the disclosure is implemented as follows.

An embodiment of the disclosure provides a remote management method for a terminal peripheral, including:

forwarding, by a Machine-to-Machine/Man (M2M) gateway, data sent from the terminal peripheral to an M2M application or an M2M service platform;

sending, by the M2M application or the M2M service platform, a remote management operation to the terminal peripheral through the M2M gateway according to the data forwarded by the M2M gateway; and processing, by the M2M gateway, the remote management operation according to remote management operation execution information fed back by the terminal peripheral, and reporting a remote management result to the M2M application or the M2M service platform.

Preferably, the forwarding data sent from the terminal peripheral to an M2M application or an M2M service platform by an M2M gateway may include:

performing, by the M2M gateway, service processing on the data sent from the terminal peripheral, and then forwarding the data to the M2M application or the M2M service platform.

Preferably, the sending a remote management operation to the terminal peripheral through the M2M gateway may include:

receiving, by the M2M gateway, the remote management operation sent from the M2M application or the M2M service platform, and retrieving whether operation information, which corresponds to the terminal peripheral and is of the same type as the remote management operation, locally exists in the M2M gateway according to an identifier of the terminal peripheral contained in the remote management operation;

when the operation information exists, judging, by the M2M gateway, whether a priority of the received remote management operation is not lower than that of the operation information; when it is not lower than the priority of the operation information, replacing, by the M2M gateway, the operation information with the received remote management operation and sending the received remote management operation to the terminal peripheral corresponding to the identifier; and when it is lower than the priority of the operation information, discarding, by the M2M gateway, the received remote management operation.

Preferably, the processing the remote management operation according to remote management operation execution information fed back by the terminal peripheral and reporting a remote management result to the M2M application or the M2M service platform by the M2M gateway, may include:

containing, by the operation execution information, an identifier of the terminal peripheral, an execution success indicator and a state value after terminal peripheral is subjected to the remote management operation, or an execution failure indicator and a failure reason value;

when the operation execution information contains the execution success indicator, locally removing, by the M2M gateway, the remote management operation of the terminal peripheral corresponding to the identifier of the terminal peripheral in the operation execution information, recording the state value in the operation execution information, and reporting successful execution of the remote management to the M2M application or the M2M service platform;

when the operation execution information contains the execution failure indicator, re-sending, by the M2M gateway, the remote management operation of the terminal peripheral corresponding to the identifier of the terminal peripheral in the local operation execution information according to a preset re-sending time; and when the remote management operation expires or has reached the preset re-sending time, locally removing, by the M2M gateway, the remote management operation of the terminal peripheral corresponding to the identifier of the terminal peripheral in the operation execution information, recording the failure reason value in the operation execution information, and reporting unsuccessful execution of the remote management to the M2M application or the M2M service platform.

Preferably, one or more terminal peripherals may be arranged, and a plurality of terminal peripherals may form a terminal peripheral group.

An embodiment of the disclosure provides a remote management method for a terminal peripheral, including:

forwarding, by a Machine-to-Machine/Man (M2M) gateway, data sent from the terminal peripheral to an M2M service platform;

storing, by the M2M service platform, the data sent from the M2M gateway;

acquiring, by an M2M application, the data stored by the M2M service platform and sending a remote management operation to the terminal peripheral through the M2M gateway according to the acquired data; and processing, by the M2M gateway, the remote management operation according to remote management operation execution information fed back by the terminal peripheral and reporting a remote management result to the M2M application.

Preferably, the sending a remote management operation to the terminal peripheral through the M2M gateway according to the acquired data may include:

receiving, by the M2M gateway, the remote management operation sent from the M2M application, and retrieving whether operation information, which corresponds to the terminal peripheral and is of the same type as the remote management operation, locally exists in the M2M gateway according to an identifier of the terminal peripheral contained in the remote management operation;

when the operation information exists, judging, by the M2M gateway, whether a priority of the received remote management operation is higher than that of the operation information; when it is higher than the priority of the operation information, replacing, by the M2M gateway, the operation information with the received remote management operation and sending the received remote management operation to the terminal peripheral corresponding to the identifier; and when it is not higher than the priority of the operation information, discarding, by the M2M gateway, the received remote management operation.

Preferably, the processing the remote management operation according to remote management operation execution information fed back by the terminal peripheral and reporting a remote management result to the M2M application by the M2M gateway may include:

containing, by the operation execution information, an identifier of the terminal peripheral, an execution success indicator and a state value after terminal peripheral is subjected to the remote management operation, or an execution failure indicator and a failure reason value;

when the operation execution information contains the execution success indicator, locally removing, by the M2M gateway, the remote management operation of the terminal peripheral corresponding to the identifier of the terminal peripheral in the operation execution information, recording the state value in the operation execution information, and reporting successful execution of the remote management to the M2M application;

when the operation execution information contains the execution failure indicator, re-sending, by the M2M gateway, the remote management operation of the terminal peripheral corresponding to the identifier of the terminal peripheral in the local operation execution information according to a preset re-sending time; and when the remote management operation expires or has reached the preset re-sending time, locally removing, by the M2M gateway, the remote management operation of the terminal peripheral corresponding to the identifier of the terminal peripheral in the operation execution information, recording the failure reason value in the operation execution information, and reporting unsuccessful execution of the remote management to the M2M application.

An embodiment of the disclosure provides an M2M gateway, including:

a forwarding unit, which is configured to forward data sent from a terminal peripheral to an M2M application or an M2M service platform; and an operation processing unit, which is configured to process a remote management operation according to remote management operation execution information fed back by the terminal peripheral and to report a remote management result to the M2M application or the M2M service platform.

An embodiment of the disclosure provides an M2M application, including:

a data receiving unit, which is configured to receive data forwarded by an M2M gateway; and an operation sending unit, which is configured to send a remote management operation to a terminal peripheral through the M2M gateway according to the data received by the data receiving unit.

An embodiment of the disclosure provides an M2M service platform, including:

a data receiving unit, which is configured to receive data forwarded by an M2M gateway; and an operation sending unit, which is configured to send a remote management operation to a terminal peripheral through the M2M gateway according to the data received by the data receiving unit.

An embodiment of the disclosure provides a remote management system for a terminal peripheral, including:

a Machine-to-Machine/Man (M2M) gateway, which is configured to forward data sent from the terminal peripheral to an M2M application or an M2M service platform, and is further configured to process a remote management operation according to remote management operation execution information fed back by the terminal peripheral and to report a remote management result to the M2M application or the M2M service platform; and the M2M application or the M2M service platform, which is configured to send the remote management operation to the terminal peripheral through the M2M gateway according to the data forwarded by the M2M gateway.

An embodiment of the disclosure provides an M2M service platform, including:

a data receiving unit, which is configured to receive data forwarded by an M2M gateway; and a storage unit, which is configured to store the data received by the data receiving unit.

An embodiment of the disclosure provides an M2M application, including:

a data acquisition unit, which is configured to acquire data stored by an M2M service platform; and an operation sending unit, which is configured to send a remote management operation to a terminal peripheral through an M2M gateway according to the data which is acquired by the data acquisition unit and is stored by the M2M service platform.

An embodiment of the disclosure provides a remote management system for a terminal peripheral, including:

a Machine-to-Machine/Man (M2M) gateway, which is configured to forward data sent from the terminal peripheral to an M2M service platform, and is further configured to process a remote management operation according to remote management operation execution information fed back by the terminal peripheral and to report a remote management result to an M2M application;

the M2M service platform, which is configured to store the data sent from the M2M gateway; and the M2M application, which is configured to acquire the data stored by the M2M service platform, and to send the remote management operation to the terminal peripheral through the M2M gateway according to the acquired data.

As seen above, the technical solution of the embodiments of the disclosure includes: the M2M gateway forwards data sent from the terminal peripheral to the M2M application or the M2M service platform; the M2M application or the M2M service platform sends a remote management operation to the terminal peripheral through the M2M gateway according to the data forwarded by the M2M gateway; the M2M gateway processes the remote management operation according to remote management operation execution information fed back by the terminal peripheral and reports a remote management result to the M2M application or the M2M service platform. Thus, through the embodiments of the disclosure, remote management is not only more targeted but also can be processed subsequently; accordingly, the terminal peripheral can be remotely managed effectively.

DETAILED DESCRIPTION

Figure 1:
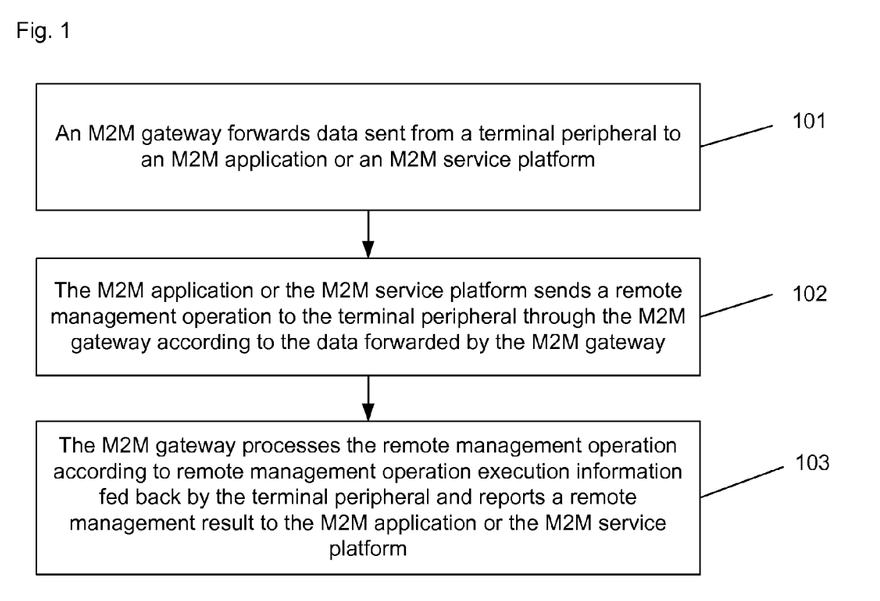
FIG. 1 is a diagram showing the flow implementation of a remote management method for a terminal peripheral according to a first embodiment of the disclosure.

A remote management method for a terminal peripheral according to a first embodiment of the disclosure is as shown in FIG. 1, including:

Step 101: An M2M gateway forwards data sent from the terminal peripheral to an M2M application or an M2M service platform, wherein the data are monitoring data or information data of the terminal peripheral.

Here, there may be one or more terminal peripherals, and a plurality of terminal peripherals form a terminal peripheral group.

Preferably, when the data are the information data of the terminal peripheral, the M2M gateway forwards data sent from the terminal peripheral to the M2M application or the M2M service platform, including:

the M2M gateway performs service processing on the data sent from the terminal peripheral and then forwards the data to the M2M application or the M2M service platform.

Step 102: The M2M application or the M2M service platform sends a remote management operation to the terminal peripheral through the M2M gateway according to the data forwarded by the M2M gateway.

Preferably, the step of sending a remote management operation to the terminal peripheral through the M2M gateway may include:

the M2M gateway receives the remote management operation sent from the M2M application or the M2M service platform, and retrieves whether operation information, which corresponds to the terminal peripheral and is of the same type as the remote management operation, locally exists in the M2M gateway according to an identifier of the terminal peripheral contained in the remote management operation;

when the operation information exists, the M2M gateway judges whether the priority of the received remote management operation is not lower than that of the operation information; when it is not lower than the priority of the operation information, the M2M gateway replaces the operation information with the received remote management operation and sends the received remote management operation to the terminal peripheral corresponding to the identifier; and when it is lower than the priority of the operation information, the M2M gateway discards the received remote management operation; and when the operation information is absent, the M2M gateway locally stores the received remote management operation and sends the received remote management operation to the terminal peripheral corresponding to the identifier.

Step 103: The M2M gateway processes the remote management operation according to remote management operation execution information fed back by the terminal peripheral, and reports a remote management result to the M2M application or the M2M service platform.

Preferably, the step that the M2M gateway processes the remote management operation according to remote management operation execution information fed back by the terminal peripheral and reports a remote management result to the M2M application or the M2M service platform may include:

the operation execution information includes the identifier of the terminal peripheral, an execution success indicator and a state value after the terminal peripheral is subjected to remote management operation, or an execution failure indicator or a failure reason value;

when the operation execution information includes the execution success indicator, the M2M gateway locally removes the remote management operation of the terminal peripheral corresponding to the identifier of the terminal peripheral in the operation execution information, records the state value in the operation execution information, and reports successful execution of the remote management to the M2M application or the M2M service platform;

when the operation execution information includes the execution failure indicator, the M2M gateway re-sends the remote management operation of the terminal peripheral corresponding to the identifier of the terminal peripheral in the local operation execution information according to a preset re-sending time; and when the remote management operation expires or has reached the preset re-sending time, the M2M gateway locally removes the remote management operation of the terminal peripheral corresponding to the identifier of the terminal peripheral in the operation execution information, records the failure reason value in the operation execution information, and reports unsuccessful execution of the remote management to the M2M application or the M2M service platform.

Figure 2:
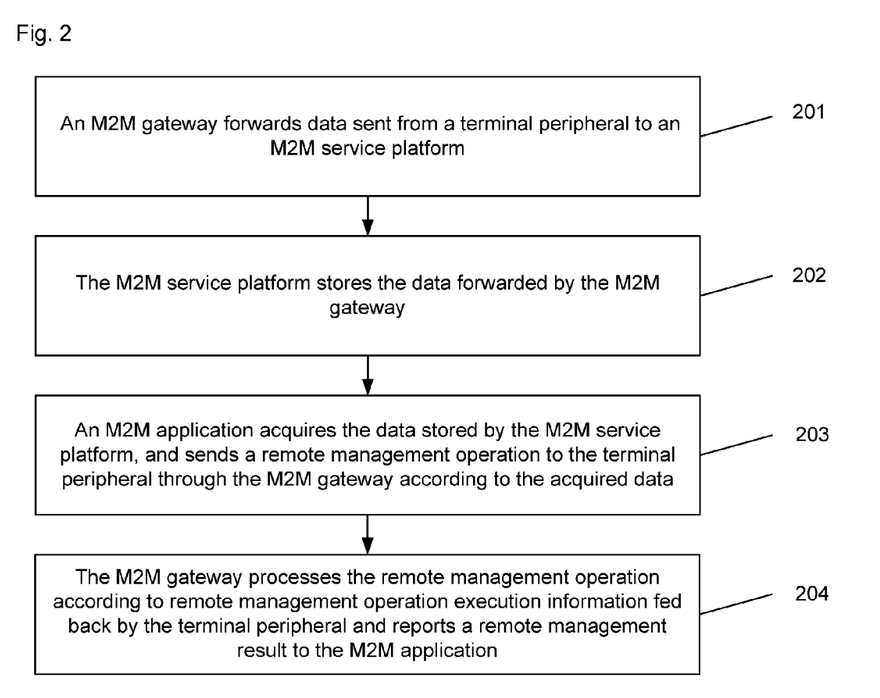
FIG. 2 is a diagram showing the flow implementation of another remote management method for a terminal peripheral according to a first embodiment of the disclosure.

Another remote management method for a terminal peripheral according to a first embodiment of the disclosure is as shown in FIG. 2, including:

Step 201: An M2M gateway forwards data sent from the terminal peripheral to an M2M service platform, wherein the data are monitoring data or information data of the terminal peripheral.

Step 202: The M2M service platform stores the data forwarded by the M2M gateway.

Step 203: An M2M application acquires the data stored by the M2M service platform, and sends a remote management operation to the terminal peripheral through the M2M gateway according to the acquired data.

Preferably, the step of sending a remote management operation to the terminal peripheral through the M2M gateway according to the acquired data may include:

the M2M gateway receives the remote management operation sent from the M2M application, and retrieves whether operation information, which corresponds to the terminal peripheral and is of the same type as the remote management operation, locally exists in the M2M gateway according to an identifier of the terminal peripheral contained in the remote management operation;

when the operation information exists, the M2M gateway judges whether the priority of the received remote management operation is higher than that of the operation information; when it is higher than the priority of the operation information, the M2M gateway replaces the operation information with the received remote management operation and sends the received remote management operation to the terminal peripheral corresponding to the identifier; and when it is not higher than the priority of the operation information, the M2M gateway discards the received remote management operation.

Step 204: The M2M gateway processes the remote management operation according to remote management operation execution information fed back by the terminal peripheral and reports a remote management result to the M2M application.

Preferably, the step that the M2M gateway processes the remote management operation according to remote management operation execution information fed back by the terminal peripheral and reports a remote management result to the M2M application may include:

the operation execution information includes the identifier of the terminal peripheral, an execution success indicator and a state value after the terminal peripheral is subjected to remote management operation, or an execution failure indicator or a failure reason value;

when the operation execution information includes the execution success indicator, the M2M gateway locally removes the remote management operation of the terminal peripheral corresponding to the identifier of the terminal peripheral in the operation execution information, records the state value in the operation execution information, and reports successful execution of the remote management to the M2M application;

when the operation execution information includes the execution failure indicator, the M2M gateway re-sends the remote management operation of the terminal peripheral corresponding to the identifier of the terminal peripheral in the local operation execution information according to a preset re-sending time; and when the remote management operation expires or has reached the preset re-sending time, the M2M gateway locally removes the remote management operation of the terminal peripheral corresponding to the identifier of the terminal peripheral in the operation execution information, records the failure reason value in the operation execution information, and reports unsuccessful execution of the remote management to the M2M application.

An embodiment of the disclosure provides an M2M gateway, including:

a forwarding unit which is configured to forward data sent from a terminal peripheral to an M2M application or an M2M service platform; and an operation processing unit which is configured to process a remote management operation according to remote management operation execution information fed back by the terminal peripheral, and to report a remote management result to the M2M application or the M2M service platform.

An embodiment of the disclosure provides an M2M application, including:

a data receiving unit which is configured to receive data forwarded by an M2M gateway;

an operation sending unit which is configured to send a remote management operation to a terminal peripheral through the M2M gateway according to the data received by the data receiving unit.

An embodiment of the disclosure provides an M2M service platform, including:

a data receiving unit which is configured to receive data forwarded by an M2M gateway;

an operation sending unit which is configured to send a remote management operation to a terminal peripheral through the M2M gateway according to the data received by the data receiving unit.

Figure 3:
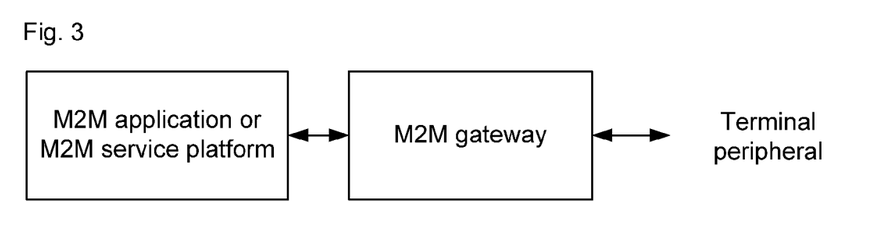
FIG. 3 is a diagram showing the structure of a remote management system for a terminal peripheral according to an embodiment of the disclosure.

A remote management system for a terminal peripheral according to an embodiment of the disclosure is as shown in FIG. 3, including:

an M2M gateway which is configured to forward data sent from the terminal peripheral to an M2M application or an M2M service platform, and is further configured to process a remote management operation according to remote management operation execution information fed back by the terminal peripheral, and to report a remote management result to the M2M application or the M2M service platform; and the M2M application or the M2M service platform which is configured to send the remote management operation to the terminal peripheral through the M2M gateway according to the data forwarded by the M2M gateway.

Another M2M service platform according to an embodiment of the disclosure includes:

a data receiving unit which is configured to receive data forwarded by an M2M gateway; and a storage unit which is configured to store the data received by the data receiving unit.

Another M2M application according to an embodiment of the disclosure includes:

a data acquisition unit which is configured to acquire data stored by an M2M service platform; and an operation sending unit which is configured to send a remote management operation to a terminal peripheral through an M2M gateway according to the data which is acquired by the data acquisition unit and is stored by the M2M service platform.

Figure 4:
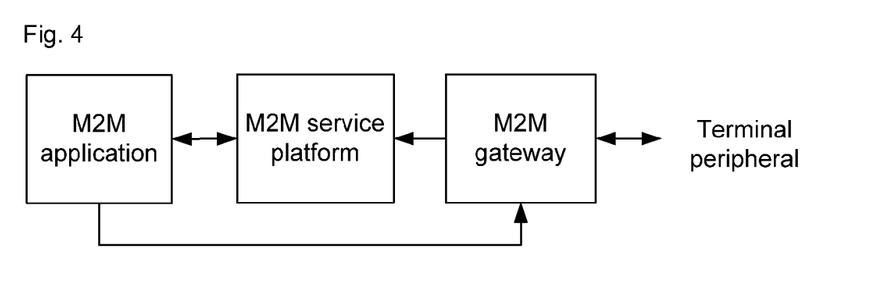
FIG. 4 is a diagram showing the structure of another remote management system for a terminal peripheral according to an embodiment of the disclosure.

Another remote management system for a terminal peripheral according to an embodiment of the disclosure is as shown in FIG. 4, including:

an M2M gateway which is configured to forward data sent from the terminal peripheral to an M2M service platform, and is further configured to process a remote management operation according to remote management operation execution information fed back by the terminal peripheral, and to report a remote management result to an M2M application;

the M2M service platform which is configured to store the data from the M2M gateway; and the M2M application which is configured to acquire the data stored by the M2M service platform, and to send the remote management operation to the terminal peripheral through the M2M gateway according to the acquired data.

Figure 5:
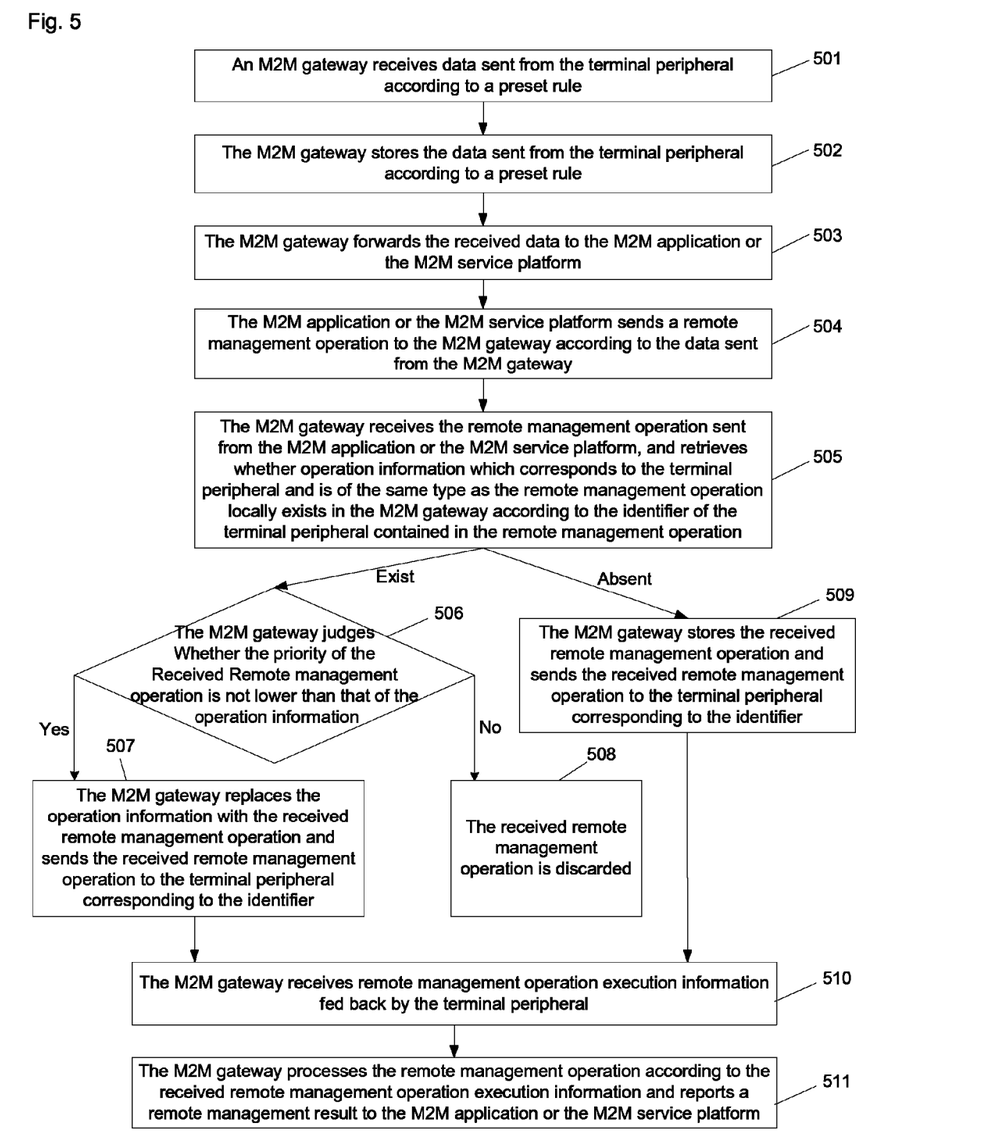
FIG. 5 is a diagram showing the flow implementation of a remote management method for a terminal peripheral according to a second embodiment of the disclosure.

A remote management method for a terminal peripheral according to a second embodiment of the disclosure is as shown in FIG. 5, including:

Step 501: An M2M gateway receives data sent from the terminal peripheral according to a preset rule.

Here, the preset rule may include a format, contents, a frequency, a priority and the like for receiving data.

The data may be monitoring data of the terminal peripheral, such as temperature, humidity and brightness, or may be information data of the terminal peripheral, such as node information, state information and capability information.

Step 502: The M2M gateway stores the data sent from the terminal peripheral according to a preset rule.

Here, the preset rule may be a mode for storing the data by the M2M gateway, such as a mode for storing the data by classification. In an actual application, a data storage list may be locally created in the M2M gateway so as to indicate the type of the stored data.

Step 503: The M2M gateway forwards the received data to an M2M application or an M2M service platform.

Specifically, when the data are the information data of the terminal peripheral, the received data are directly forwarded to the M2M application or the M2M service platform.

The stored data are monitored when the data are the monitoring data of the terminal peripheral, and are forwarded to the M2M application or the M2M service platform when satisfying a threshold defined by a service. In an actual application, the stored data may be detected according to the preset rule, wherein the preset rule may be a mode for detecting the data by the M2M gateway, such as a mode for detecting the data by classification, specifically, a data priority list may be locally created in the M2M gateway so as to indicate the level of the stored data; the M2M gateway further sets a retrieval frequency for the data according to the priority of the data, namely, the higher the level value is, the higher the retrieval frequency is; and the lower the level value is, the lower the retrieval frequency is.

Step 504: The M2M application or the M2M service platform sends a remote management operation to the M2M gateway by service logic judgement according to the data sent from the M2M gateway.

Here, the remote management operation may include an identifier of the terminal peripheral, such as operation information, effective time and priority information.

Step 505: The M2M gateway receives the remote management operation sent from the M2M application or the M2M service platform, and retrieves whether operation information, which corresponds to the terminal peripheral and is of the same type as the remote management operation, locally exists in the M2M gateway according to the identifier of the terminal peripheral contained in the remote management operation; when the operation information exists, step 506 is executed; otherwise, step 509 is executed.

Step 506: The M2M gateway judges whether the priority of the received remote management operation is not lower than that of the operation information; when it is not lower than the priority of the operation information, step 507 is executed; otherwise, step 508 is executed.

Step 507: The M2M gateway replaces the operation information with the received remote management operation, and sends the received remote management operation to the terminal peripheral corresponding to the identifier to execute step 510.

Step 508: The M2M gateway discards the received remote management operation to end the flow.

Step 509: The M2M gateway stores the received remote management operation, and sends the received remote management operation to the terminal peripheral corresponding to the identifier.

Step 510: The M2M gateway receives remote management operation execution information fed back by the terminal peripheral.

Here, the operation execution information includes the identifier of the terminal peripheral, an execution success indicator and a state value after the terminal peripheral executes the remote management operation, or an execution failure indicator and a failure reason value;

namely, the operation execution information may contain the two following conditions:

A: identifier of the terminal peripheral+execution success indicator+state value; and B: identifier of the terminal peripheral+execution failure indicator+failure reason value.

Step 511: The M2M gateway processes the remote management operation according to the received remote management operation execution information, and reports a remote management result to the M2M application or the M2M service platform.

Specifically, when the operation execution information includes the execution success indicator, the M2M gateway locally removes the remote management operation of the terminal peripheral corresponding to the identifier of the terminal peripheral in the operation execution information, records the state value in the operation execution information, and reports successful execution of the remote management to the M2M application or the M2M service platform;

when the operation execution information includes the execution failure indicator, the M2M gateway re-sends the remote management operation of the terminal peripheral corresponding to the identifier of the terminal peripheral in the local operation execution information according to a preset re-sending time; and when the remote management operation expires or has reached the preset re-sending time, the M2M gateway locally removes the remote management operation of the terminal peripheral corresponding to the identifier of the terminal peripheral in the operation execution information, records the failure reason value in the operation execution information, and reports unsuccessful execution of the remote management to the M2M application or the M2M service platform.

The M2M gateway carries out subsequent remote management according to the operation execution information fed back by the terminal peripheral, so that the remote management is more targeted and the terminal peripheral can be remotely managed effectively.

Another remote management method for a terminal peripheral according to a second embodiment of the disclosure includes the following steps:

Step 601: An M2M gateway receives data sent from the terminal peripheral according to a preset rule.

Here, the preset rule may include a format, contents, a frequency, a priority and the like for receiving data.

The data may be monitoring data of the terminal peripheral, such as temperature, humidity and brightness, or may be information data of the terminal peripheral, such as node information, state information and capability information.

Step 602: The M2M gateway stores the data sent from the terminal peripheral according to a preset rule, and forwards the data to an M2M service platform.

Here, the preset rule may be a mode for storing the data by the M2M gateway, such as a mode for storing data by classification. In an actual application, a data storage list may be locally created in the M2M gateway so as to indicate the type of the stored data.

Step 603: The M2M service platform stores the data sent from the M2M gateway according to a preset rule.

Here, the preset rule may be a mode for storing the data by the M2M service platform, such as a mode for storing data by classification. In an actual application, a data storage list may be locally created in the M2M service platform so as to indicate the type of the stored data.

Step 604: An M2M application queries the data of the terminal peripheral by sending an information query operation to the M2M service platform.

Here, the information query operation contains an identifier of the terminal peripheral.

Step 605: The M2M service platform receives the information query operation sent from the M2M application, and sends the data of the terminal peripheral corresponding to the identifier in the information query operation locally stored to the M2M application by an information feedback operation.

Here, the information feedback operation contains the identifier and the data of the terminal peripheral.

Step 606: The M2M application sends a remote management operation to the M2M gateway by service logic judgement according to the data sent from the M2M service platform.

Here, the remote management operation may include the identifier of the terminal peripheral, such as operation information, effective time and priority information.

Step 607: The M2M gateway receives the remote management operation sent from the M2M application or the M2M service platform, and retrieves whether operation information, which corresponds to the terminal peripheral and is of the same type as the remote management operation, locally exists in the M2M gateway according to the identifier of the terminal peripheral contained in the remote management operation; when the operation information exists, step 608 is executed; otherwise, step 611 is executed.

Step 608: The M2M gateway judges whether the priority of the received remote management operation is higher than that of the operation information; when it is higher than the priority of the operation information, step 609 is executed; otherwise, step 610 is executed.

Step 609: The M2M gateway replaces the operation information with the received remote management operation, and sends the received remote management operation to the terminal peripheral corresponding to the identifier to execute step 612.

Step 610: The M2M gateway discards the received remote management operation to end the flow.

Step 611: The M2M gateway stores the received remote management operation, and sends the received remote management operation to the terminal peripheral corresponding to the identifier.

Step 612: The M2M gateway receives remote management operation execution information fed back by the terminal peripheral.

Here, the operation execution information includes the identifier of the terminal peripheral, an execution success indicator and a state value after the terminal peripheral executes the remote management operation, or an execution failure indicator and a failure reason value;

namely, the operation execution information may contain the two following conditions:

A: identifier of the terminal peripheral+execution success indicator+state value; and B: identifier of the terminal peripheral+execution failure indicator+failure reason value.

Step 613: The M2M gateway processes the remote management operation according to the received remote management operation execution information, and reports a remote management result to the M2M application.

Specifically, when the operation execution information includes the execution success indicator, the M2M gateway locally removes the remote management operation of the terminal peripheral corresponding to the identifier of the terminal peripheral in the operation execution information, records the state value in the operation execution information, and reports successful execution of the remote management to the M2M application;

when the operation execution information includes the execution failure indicator, the M2M gateway re-sends the remote management operation of the terminal peripheral corresponding to the identifier of the terminal peripheral in the local operation execution information according to a preset re-sending time; and when the remote management operation expires or has reached the preset re-sending time, the M2M gateway locally removes the remote management operation of the terminal peripheral corresponding to the identifier of the terminal peripheral in the operation execution information, records the failure reason value in the operation execution information, and reports unsuccessful execution of the remote management to the M2M application.

In the embodiment, the terminal peripheral sends the data to the M2M gateway which forwards the received data to the M2M service platform; the M2M service platform stores the received data; and the M2M application acquires the data stored by the M2M service platform by query, so that the security of data transmission can be improved.

In this text, the terminal peripheral remotely managed may be different from or the same as the terminal peripheral reporting data to the M2M gateway.

The above are only preferred embodiments of the disclosure, and are not intended to limit the scope of protection of the claims of the disclosure.

The invention claimed is:

1. A remote management method for a terminal peripheral, comprising:

forwarding, by a Machine-to-Machine/Man (M2M) gateway, data sent from the terminal peripheral to an M2M application or an M2M service platform;

sending, by the M2M application or the M2M service platform, a remote management operation to the terminal peripheral through the M2M gateway according to the data forwarded by the M2M gateway; and processing, by the M2M gateway, the remote management operation according to remote management operation execution information fed back by the terminal peripheral, and reporting a remote management result to the M2M application or the M2M service platform;

wherein the step of processing the remote management operation according to remote management operation execution information fed back by the terminal peripheral and reporting a remote management result to the M2M application or the M2M service platform by the M2M gateway, comprises:

containing, by the operation execution information, an identifier of the terminal peripheral, an execution success indicator and a state value after terminal peripheral is subjected to the remote management operation, or an execution failure indicator and a failure reason value;

when the operation execution information contains the execution success indicator, locally removing, by the M2M gateway, the remote management operation of the terminal peripheral corresponding to the identifier of the terminal peripheral in the operation execution information, recording the state value in the operation execution information, and reporting successful execution of the remote management to the M2M application or the M2M service platform;

when the operation execution information contains the execution failure indicator, re-sending, by the M2M gateway, the remote management operation of the terminal peripheral corresponding to the identifier of the terminal peripheral in the local operation execution information according to a preset re-sending time; and when the remote management operation expires or has reached the preset re-sending time, locally removing, by the M2M gateway, the remote management operation of the terminal peripheral corresponding to the identifier of the terminal peripheral in the operation execution information, recording the failure reason value in the operation execution information, and reporting unsuccessful execution of the remote management to the M2M application or the M2M service platform.

2. The method according to claim 1, wherein the forwarding data sent from the terminal peripheral to an M2M application or an M2M service platform by an M2M gateway comprises:
performing, by the M2M gateway, service processing on the data sent from the terminal peripheral, and then forwarding the data to the M2M application or the M2M service platform.

3. The method according to claim 2, wherein one or more terminal peripherals are arranged, and a plurality of terminal peripherals form a terminal peripheral group.

4. The method according to claim 1, wherein the sending a remote management operation to the terminal peripheral through the M2M gateway comprises:
receiving, by the M2M gateway, the remote management operation sent from the M2M application or the M2M service platform, and retrieving whether operation information, which corresponds to the terminal peripheral and is of the same type as the remote management operation, locally exists in the M2M gateway according to an identifier of the terminal peripheral contained in the remote management operation;
when the operation information exists, judging, by the M2M gateway, whether a priority of the received remote management operation is not lower than that of the operation information; when it is not lower than the priority of the operation information, replacing, by the M2M gateway, the operation information with the received remote management operation and sending the received remote management operation to the terminal peripheral corresponding to the identifier; and when it is lower than the priority of the operation information, discarding, by the M2M gateway, the received remote management operation.

5. The method according to claim 4, wherein one or more terminal peripherals are arranged, and a plurality of terminal peripherals form a terminal peripheral group.

6. The method according to claim 1, wherein one or more terminal peripherals are arranged, and a plurality of terminal peripherals form a terminal peripheral group.

7. A remote management method for a terminal peripheral, comprising:
forwarding, by a Machine-to-Machine/Man (M2M) gateway, data sent from the terminal peripheral to an M2M service platform;
storing, by the M2M service platform, the data sent from the M2M gateway;
acquiring, by an M2M application, the data stored by the M2M service platform and sending a remote management operation to the terminal peripheral through the M2M gateway according to the acquired data; and
processing, by the M2M gateway, the remote management operation according to remote management operation execution information fed back by the terminal peripheral and reporting a remote management result to the M2M application;

wherein the step of processing the remote management operation according to remote management operation execution information fed back by the terminal peripheral and reporting a remote management result to the M2M application by the M2M gateway comprises:
containing, by the operation execution information, an identifier of the terminal peripheral, an execution success indicator and a state value after terminal peripheral is subjected to the remote management operation, or an execution failure indicator and a failure reason value;
when the operation execution information contains the execution success indicator, locally removing, by the M2M gateway, the remote management operation of the terminal peripheral corresponding to the identifier of the terminal peripheral in the operation execution information, recording the state value in the operation execution information, and reporting successful execution of the remote management to the M2M application;
when the operation execution information contains the execution failure indicator, re-sending, by the M2M gateway, the remote management operation of the terminal peripheral corresponding to the identifier of the terminal peripheral in the local operation execution information according to a preset re-sendinq time; and when the remote management operation expires or has reached the preset re-sending time, locally removing, by the M2M gateway, the remote management operation of the terminal peripheral corresponding to the identifier of the terminal peripheral in the operation execution information, recording the failure reason value in the operation execution information, and reporting unsuccessful execution of the remote management to the M2M application.

8. The method according to claim 7, wherein the sending a remote management operation to the terminal peripheral through the M2M gateway according to the acquired data comprises:
receiving, by the M2M gateway, the remote management operation sent from the M2M application, and retrieving whether operation information, which corresponds to the terminal peripheral and is of the same type as the remote management operation, locally exists in the M2M gateway according to an identifier of the terminal peripheral contained in the remote management operation;
when the operation information exists, judging, by the M2M gateway, whether a priority of the received remote management operation is higher than that of the operation information; when it is higher than the priority of the operation information, replacing, by the M2M gateway, the operation information with the received remote management operation and sending the received remote management operation to the terminal peripheral corresponding to the identifier; and when it is not higher than the priority of the operation information, discarding, by the M2M gateway, the received remote management operation.

9. A Machine-to-Machine/Man (M2M) gateway, comprising:
a processor; and
a memory for storing instructions executable by the processor;
wherein the processor is arranged to:
forward data sent from a terminal peripheral to an M2M application or an M2M service platform; and process a remote management operation according to remote management operation execution information fed back by the terminal peripheral and to report a remote management result to the M2M application or the M2M service platform;

wherein the operation execution information contains an identifier of the terminal peripheral, an execution success indicator and a state value after terminal peripheral is subjected to the remote management operation, or an execution failure indicator and a failure reason value; and the processor is further arranged to:

when the operation execution information contains the execution success indicator, locally remove the remote management operation of the terminal peripheral corresponding to the identifier of the terminal peripheral in the operation execution information, record the state value in the operation execution information, and report successful execution of the remote management to the M2M application or the M2M service platform;

when the operation execution information contains the execution failure indicator, re-send the remote management operation of the terminal peripheral corresponding to the identifier of the terminal peripheral in the local operation execution information according to a preset re-sending time; and when the remote management operation expires or has reached the preset re-sending time, locally remove the remote management operation of the terminal peripheral corresponding to the identifier of the terminal peripheral in the operation execution information, record the failure reason value in the operation execution information, and report unsuccessful execution of the remote management to the M2M application or the M2M service platform.

10. A remote management system for a terminal peripheral, comprising:

a Machine-to-Machine/Man (M2M) gateway, which is arranged to forward data sent from the terminal peripheral to an M2M application or an M2M service platform, and is further arranged to process a remote management operation according to remote management operation execution information fed back by the terminal peripheral and to report a remote management result to the M2M application or the M2M service platform; and the M2M application or the M2M service platform, which is arranged to send the remote management operation to the terminal peripheral through the M2M gateway according to the data forwarded by the M2M gateway;

wherein the operation execution information contains an identifier of the terminal peripheral, an execution success indicator and a state value after terminal peripheral is subjected to the remote management operation, or an execution failure indicator and a failure reason value; and the M2M gateway is further arranged to:

when the operation execution information contains the execution success indicator, locally remove the remote management operation of the terminal peripheral corresponding to the identifier of the terminal peripheral in the operation execution information, record the state value in the operation execution information, and report successful execution of the remote management to the M2M application or the M2M service platform;

when the operation execution information contains the execution failure indicator, re-send the remote management operation of the terminal peripheral corresponding to the identifier of the terminal peripheral in the local operation execution information according to a preset re-sending time; and when the remote management operation expires or has reached the preset re-sending time, locally remove the remote management operation of the terminal peripheral corresponding to the identifier of the terminal peripheral in the operation execution information, record the failure reason value in the operation execution information, and report unsuccessful execution of the remote management to the M2M application or the M2M service platform.

11. A remote management system for a terminal peripheral, comprising:

a Machine-to-Machine/Man (M2M) gateway, which is arranged to forward data sent from the terminal peripheral to an M2M service platform, and is further arranged to process a remote management operation according to remote management operation execution information fed back by the terminal peripheral and to report a remote management result to an M2M application;

the M2M service platform, which is arranged to store the data sent from the M2M gateway; and the M2M application, which is arranged to acquire the data stored by the M2M service platform, and to send the remote management operation to the terminal peripheral through the M2M gateway according to the acquired data;

wherein the operation execution information contains an identifier of the terminal peripheral, an execution success indicator and a state value after terminal peripheral is subjected to the remote management operation, or an execution failure indicator and a failure reason value; and the M2M gateway is further arranged to:

when the operation execution information contains the execution success indicator, locally remove the remote management operation of the terminal peripheral corresponding to the identifier of the terminal peripheral in the operation execution information, record the state value in the operation execution information, and report successful execution of the remote management to the M2M application;

when the operation execution information contains the execution failure indicator, re-send the remote management operation of the terminal peripheral corresponding to the identifier of the terminal peripheral in the local operation execution information according to a preset re-sending time; and when the remote management operation expires or has reached the preset re-sending time, locally remove the remote management operation of the terminal peripheral corresponding to the identifier of the terminal peripheral in the operation execution information, record the failure reason value in the operation execution information, and report unsuccessful execution of the remote management to the M2M application.

12. A remote management method for a terminal peripheral, comprising:

forwarding, by a Machine-to-Machine/Man (M2M) gateway, data sent from the terminal peripheral to an M2M application or an M2M service platform;

sending, by the M2M application or the M2M service platform, a remote management operation to the terminal peripheral through the M2M gateway according to the data forwarded by the M2M gateway; and processing, by the M2M gateway, the remote management operation according to remote management operation execution information fed back by the terminal peripheral, and reporting a remote management result to the M2M application or the M2M service platform;

wherein the sending a remote management operation to the terminal peripheral through the M2M gateway comprises:

receiving, by the M2M gateway, the remote management operation sent from the M2M application or the M2M service platform, and retrieving whether operation information, which corresponds to the terminal peripheral and is of the same type as the remote management operation, locally exists in the M2M gateway according to an identifier of the terminal peripheral contained in the remote management operation;

when the operation information exists, judging, by the M2M gateway, whether a priority of the received remote management operation is not lower than that of the operation information; when it is not lower than the priority of the operation information, replacing, by the M2M gateway, the operation information with the received remote management operation and sending the received remote management operation to the terminal peripheral corresponding to the identifier; and when it is lower than the priority of the operation information, discarding, by the M2M gateway, the received remote management operation.

13. A remote management method for a terminal peripheral, comprising:

forwarding, by a Machine-to-Machine/Man (M2M) gateway, data sent from the terminal peripheral to an M2M service platform;

storing, by the M2M service platform, the data sent from the M2M gateway;

acquiring, by an M2M application, the data stored by the M2M service platform and sending a remote management operation to the terminal peripheral through the M2M gateway according to the acquired data; and processing, by the M2M gateway, the remote management operation according to remote management operation execution information fed back by the terminal peripheral and reporting a remote management result to the M2M application;

wherein the sending a remote management operation to the terminal peripheral through the M2M gateway according to the acquired data comprises:

receiving, by the M2M gateway, the remote management operation sent from the M2M application, and retrieving whether operation information, which corresponds to the terminal peripheral and is of the same type as the remote management operation, locally exists in the M2M gateway according to an identifier of the terminal peripheral contained in the remote management operation;

when the operation information exists, judging, by the M2M gateway, whether a priority of the received remote management operation is higher than that of the operation information; when it is higher than the priority of the operation information, replacing, by the M2M gateway, the operation information with the received remote management operation and sending the received remote management operation to the terminal peripheral corresponding to the identifier; and when it is not higher than the priority of the operation information, discarding, by the M2M gateway, the received remote management operation.

* * * * *